United States Patent [19]

Embry

[11] Patent Number: 4,646,684
[45] Date of Patent: Mar. 3, 1987

[54] ANIMAL WASTE CONTAINER

[76] Inventor: Marjorie L. Embry, 1800 Monticello, Trenton, Mich. 48183

[21] Appl. No.: 756,279

[22] Filed: Jul. 18, 1985

[51] Int. Cl.⁴ .............................................. A01K 1/00
[52] U.S. Cl. ..................................................... 119/1
[58] Field of Search ..................... 119/1; 220/403, 470

[56] References Cited

U.S. PATENT DOCUMENTS

| | | | |
|---|---|---|---|
| 3,735,735 | 5/1973 | Noroian | 119/1 |
| 3,809,013 | 5/1974 | Rigney et al. | 119/1 |
| 3,990,396 | 11/1976 | Turk | 119/1 |
| 4,156,400 | 5/1979 | Migdal | 119/1 |
| 4,279,217 | 7/1981 | Behringer | 119/1 |
| 4,312,295 | 1/1982 | Harrington | 119/1 |

FOREIGN PATENT DOCUMENTS

1331138  5/1963  France ................................ 220/403

Primary Examiner—Robert P. Swiatek
Attorney, Agent, or Firm—Price, Heneveld, Cooper, DeWitt & Litton

[57] ABSTRACT

A container for receiving a liner and a granular material to be placed on the liner for absorbing and covering animal wastes includes a rectangular enclosure having erect sidewalls and a bottom wall. A gap is provided at each corner of the enclosure between adjacent sidewalls of the enclosure. A sufficiently large, flat rectangular liner placed in the enclosure overlaying the bottom wall will fold into the gaps and an edge portion of the liner will assume an erect orientation overlying the sidewalls.

22 Claims, 16 Drawing Figures

ANIMAL WASTE CONTAINER

BACKGROUND OF THE INVENTION

This invention relates to containers for collecting animal wastes, and in particular to cat litter boxes which are filled with an absorbant material that absorbs animal urine and moisture from animal feces. This absorbant material is commonly called cat litter.

Manufacturers have sold a wide variety of reusable plastic cat litter boxes to consumers as alternatives to cardboard boxes which often become soggy and acrid with cat urine. To make the job of cleaning the plastic cat litter boxes as bearable as possible, manufacturers have provided plastic inserts or liners. Such liners are invariably contoured, that is, they have heat sealed seams which seal one or more sheets of plastic to form a squat bag-like liner with sides and a bottom to line the sides and bottom of the box.

Plastic cat litter boxes, however, have been manufactured in such a wide variety of different sizes and shapes that no single manufacturer can provide fitting liners for each box size. Rather, manufacturers have generally resorted to providing a "generic" sized liner capable of use in a variety of differently sized boxes. However, the generic liner is too large for many boxes, creating large folds or wrinkles when installed, which often are the fancy of the cat's primitive desires to claw and shred. Some cats also have the peculiar habit of burying the sides of the liner in the cat litter. The shredded or buried liner allows the cat litter—and whatever else is in it—to leak from the liner, forcing the pet owner to do the cleaning job he tried to avoid in using the liner in the first place.

The contoured liners are not inexpensive. They entail heat sealing single or double pieces of plastic to form a squat bag. Often, consumers will try to avoid the expense of contoured liners by purchasing flat plastic or by cutting plastic garbage bags to size because garbage bags are often less expensive as production runs for garbage bags are longer than production runs for cat litter liners. Garbage bags, however, fit no better than the contoured liners or flat liner sheets and result in the same problems with folds and buried sides.

Finally, liners do not eliminate all odor problems. Often, the odor of a cat litter box becomes unbearable, even though much of the litter is still good. A frugal cat owner buys a "pooper-scooper TM," a sieve with a short handle, to sift out the odoriferous fecal matter and clumps of cat litter agglomerated with urine. A profligate cat owner will avoid the prolonged olfactory assualt involved in patiently sifting out such matter and throw out the good litter with the bad.

SUMMARY OF THE INVENTION

The cat litter box of the present invention eliminates the need for specially contoured plastic liners since it is designed to allow the use of flat liners. Due to the novel construction of the present cat litter box, the liners will fold almost by themselves when placed in the box to cover the sidewalls of the box. Thus, the expense of specially manufactured contoured liners is avoided. The flat liner can be cut by the user from a roll of plastic.

More conveniently, however, the consumer can buy a premanufactured liner system, another aspect of the present invention. The liner system includes a flat, flexible base liner and a plurality of overlying foraminous flat, flexible liners which are placed one on top of the other in a cat litter box. The cat litter is then placed over the layered liners. When the cat litter becomes acrid, the cat litter can be sifted to remove the odor-causing waste products simply by removing the upper foraminous liner member and permitting the unspent clean cat litter to sift through the openings in the upper foraminous liner member. This process can be repeated when the cat litter once again becomes acrid, filtering the remaining cat litter by removing the next foraminous liner member. Finally, when none of the litter left is reusable, the remaining part of the liner system, namely, the base liner, can be removed with the remaining cat litter.

To accommodate flat liners, the animal waste container of the present invention is an enclosure having erect sidewalls and a bottom wall wherein means are provided at each corner of the enclosure between adjacent sidewalls of the enclosure to accommodate the material which gathers at the corner portions of a sufficiently large, flat rectangular liner when the liner is placed in the enclosure overlying the bottom wall with edge portions of the liner overlying the sidewalls. In one particular embodiment, gaps between adjacent sidewalls of a rectangular plastic cat litter box are provided and permit the corner portions of a flat liner which gather to form 45 folds to project through the gaps between the sidewalls. Thus, there is no need to use a contoured cat litter box liner.

DETAILED DESCRIPTION OF THE PREFERRED EMBODIMENT

Figure 1:
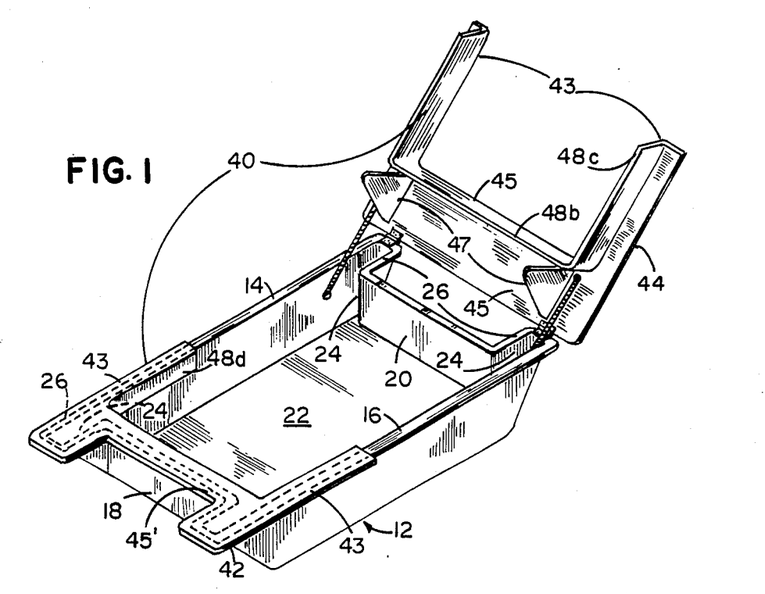
FIG. 1 is a perspective view of the cat litter box of the present invention without a liner with one of the pivotal cover portions in the open position.
Figure 2:
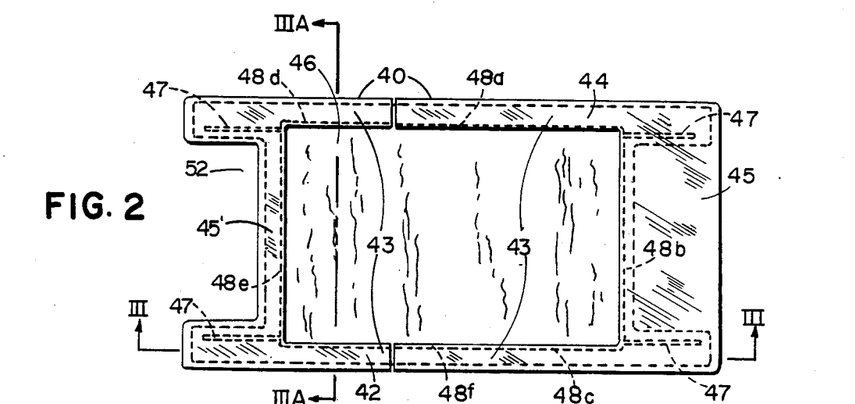
FIG. 2 is a top view of the cat litter box of the present invention with a liner therein and with both cover portions in the closed position.
Figure 3:
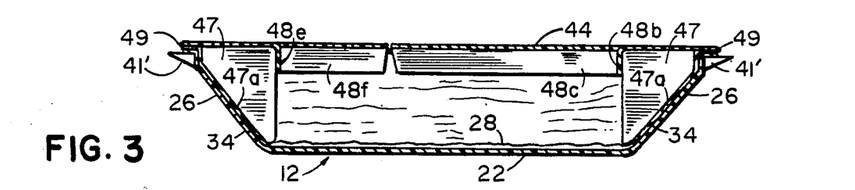
FIG. 3 is a cross section taken along the plane of line III—III of FIG. 2.
Figures 3A, 4, 5:
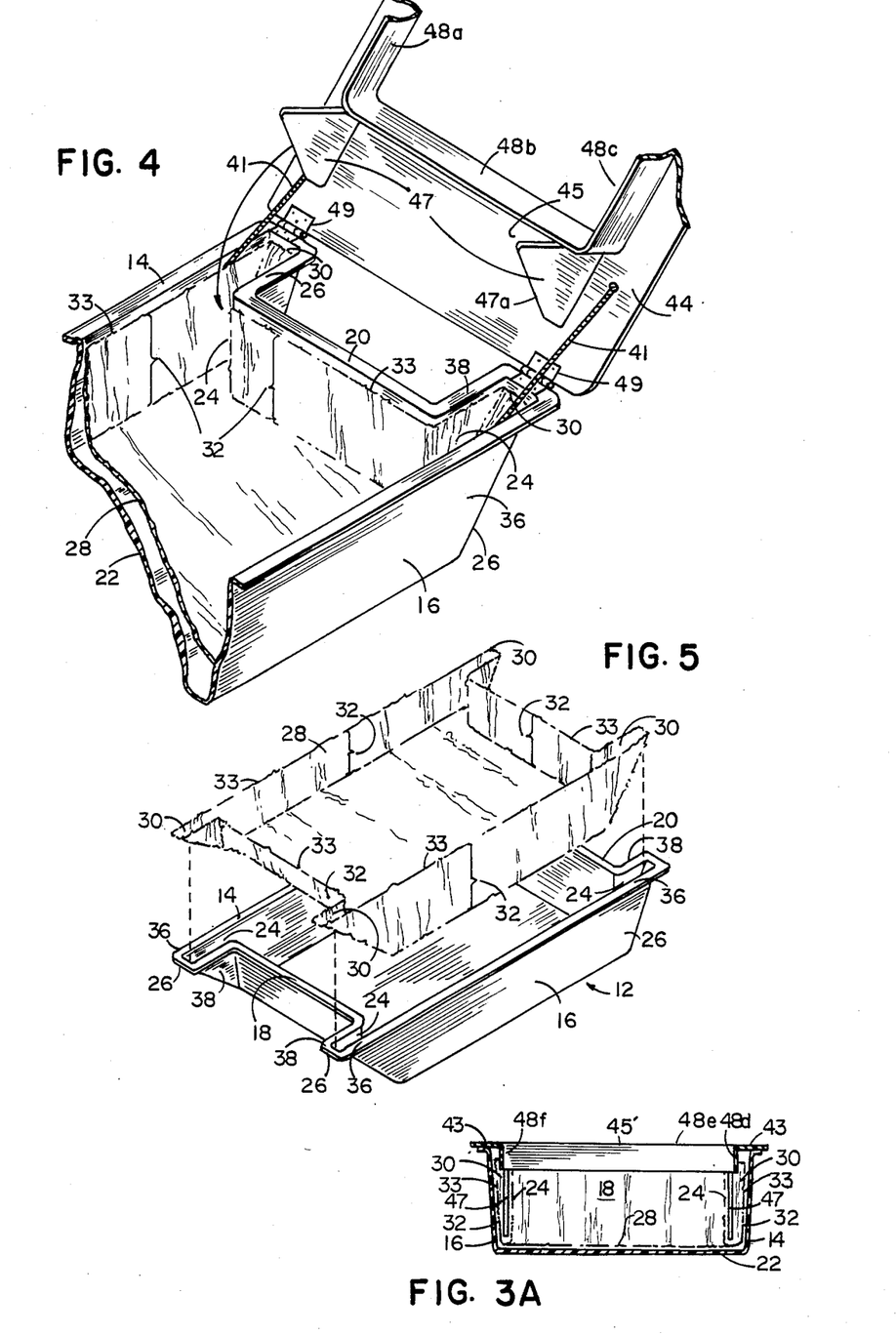
FIG. 3A is a cross section taken along the plane of line IIIA—IIIA of FIG. 2.
FIG. 4 is a detailed perspective view of one end of the container portion of the cat litter box shown in FIGS. 1–3 having a flat liner placed therein.
FIG. 5 is an exploded perspective view of the bottom of the cat litter box of the present invention with a liner shown in the folded position it would assume when placed in the box.

The cat litter box 10 (FIGS. 1-4) of the present invention includes a rectangular enclosure 12 having erect sidewalls 14, 16, 18 and 20 extending upwardly from a bottom wall 22. Between each adjacent sidewall, for instance, between sidewalls 14 and 20, a gap 24 is provided which extends from the top of the two adjacent sidewalls downwardly to bottom wall 22. Each corner gap 24 is enclosed by a corner shroud 26 extending outwardly from the enclosure 12. As shown in FIG. 4, a flat, rectangular plastic liner 28 can be placed within enclosure 12 such that the corner portions 30 (FIGS. 4 and 5) of liner 28 fold into gaps 24 and the edge portions 32 will assume an erect orientation overlying sidewalls 14, 16, 18 and 20. It is apparent, therefore, that the cat litter box of the present invention has a configuration which forces a flat, rectangular plastic liner sheet to assume the configuration of enclosure 12, eliminating the necessity of specially manufactured contoured liners.

Enclosure 12, as indicated above, has a bottom wall 22 and four upwardly extending erect sidewalls 14, 16, 18 and 20 forming a rectangular container. Adjacent sidewalls 14 and 18, 18 and 12, 12 and 20, and 20 and 14 are not directly joined at the corners of enclosure 12. Instead, a gap 24 is provided between each pair of adjacent, perpendicular sidewalls to accommodate the material which gathers at the corners of a flat liner placed in the enclosure such that portions of the liners cover the sidewalls of the enclosure. When a flat, rectangular plastic lining is placed in overlying relationship to bottom wall 22 (FIGS. 4 and 5), portions 32 along the edges of liner 28 will fold upwardly and assume an erect position overlying sidewalls 14, 16, 18 or 20. Gaps 24, or other such means, permit edge portions 32 to assume this position by allowing corner portions 30 to fold and project into gaps 24. The effect is similar to putting a flat sheet on a mattress in making a bed. The material which gathers at the corners of the sheet draped over the mattress is folded underneath the portions of the sheet which drape over the side of the mattress to form a neatly folded appearance at the corners of the mattress.

Figure 6:
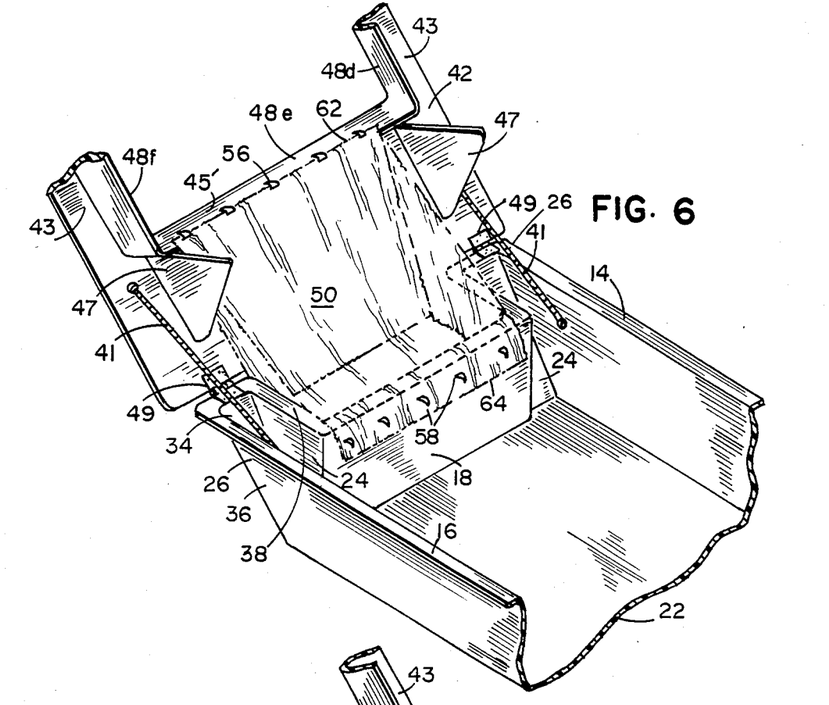
FIG. 6 is a detailed perspective view of an end of the cat litter box of the present invention illustrating the means for mounting a disposal bag in the box.

Corner portions 30, however, are not folded inside or outside edge portions 32. Instead, corner portions 30 project outwardly from the center of enclosure 12 and into corner shrouds 26 which cover gaps 24 at each corner of enclosure 12. Each corner shroud 26 is essentially identical to the other corner shrouds 26, so only one will be described in detail. As shown in FIGS. 3, 5 and 6, the corner shroud 26 between sidewalls 16 and 18 includes a downwardly sloping bottom wall 34 which starts at the level of the upper edges of sidewalls 16 and 18 and slopes downwardly to meet bottom wall 22. Two spaced side portions 36 and 38 on either side of gap 24 join bottom wall 34 to sidewalls 16 and 18, respectively. In fact, sloping bottom 34, side portions 36 and 38, bottom wall 22 and sidewalls 16 and 18 are integrally formed with one another to create a leakproof enclosure.

Sloping bottom 34 has an angle of about 45° with respect to bottom wall 22. This angle is substantially the same angle that the folded corner portions 30, which gather at the corners of the liner, will assume when they extend into each corner shroud 26. Thus, corner portions 30 will be supported by the sloping bottoms 34 when the liner is installed as shown in FIGS. 4 and 5. Side portions 36 and 38 are spaced from each other as shown in FIG. 4 to permit corner portions 30 to be gently, rather than sharply, folded as shown in FIG. 4.

Permitting corner portions 30 of liner 28 to fold and extend through gaps 24 allows edge portions 32 of liner 28 to assume an erect position overlying sidewalls 14, 16, 18 and 20 (FIGS. 3 and 4). The liner will assume this position with minimal spreading of the liner by hand in enclosure 12. When liner 28 is in the proper position, cat litter or other granular material can be placed in the liner for the animal.

To thwart the animal from burying or clawing the edges of the liner, a cover member 40 consisting of two pivotal C-shaped portions 42 and 44 is included. Each C-shaped portion 42 or 44 has two spaced arms 43 joined by a bight portion 45 (or 45'). The bight 45' of C-shaped portion 42 is hinged by hinges 49 (FIG. 6) to the upper ends of the corner shrouds 26 on either side of sidewall 18. Hinges 49 may also be molded as a "living" hinge, which means that the entire assembly can be molded in a single piece. The bight 45 of C-shaped portion 42 is hinged by hinges 49 (FIG. 4) to the upper ends of corner shrouds 26 on either side of sidewall 20.

When closed (FIG. 2), the two C-shaped pivotal portions 42 and 44 form a large central opening 46 which permits the cat to enter and exit the box. Positioned around the periphery of opening 46 along arms 43 and bight portions 45, extending downwardly into enclosure 12, are flanges 48a-f which overlay the upper interior surfaces of sidewalls 14, 16, 18 and 20 when the cover portions are closed. Flanges 48a and c extend along arms 43 of cover portion 44, while flange 48b extends along bight portion 45 of cover portion 44. Accordingly, when cover member 44 is pivoted downwardly, arms 43 will overlay the tops of sidewalls 14 and 16, while flanges 48a and 48c overlay the upper vertical surfaces of sidewalls 14 and 16, and bight portion 45 overlays the upper edge of sidewall 18, while flange 48b overlays the upper vertical interior surface of end wall 20. Similarly, flanges 48d and 48f extend along arms 43 of cover portion 42, and flange 48e extends along bight portion 45' of cover portion 42. As shown in FIG. 3A, flanges 48 will cover the peripheral edges 33 of liner 28 near the upper edges of the enclosure sidewalls so that the liner edges do not attract the animal's attention. With flanges 48a-f concealing the peripheral edges 33 of the liner, it has been found that the cat tends not to bury or claw at the liner.

Each C-shaped cover portion 42 or 44 further includes a pair of retaining wings 47 located at each end of bight portion 45, 45'. Retaining wings are positioned to project downwardly into corner shrouds 26 when the cover portions 42 and 44 are closed and to be received within the gently folded corner portions 30 as indicated by the arrow A shown in FIG. 4. As shown in FIG. 3, each retaining wing 47 has a 45° angle edge 47a which conforms to and rests on sloping bottom 34 when the cover portions are closed and urges corner portion 30 tightly against sloping bottom 34 of corner shroud 26. This helps the liner edge portions 32 stay erect since retaining wings 47 have a tendency to pull corner portions 34 into shrouds 26.

Cover portions 42 and 44 are freely pivotal on hinges 49 from open to closed positions. Cords 41 (FIGS. 4 and 7) connected between the enclosure sidewalls and each cover portion prevent the cover portions from pivoting too far open and breaking hinges 49. As an alternative to cords 41, gussett-like projections 41' (FIG. 3) can be provided which extend outwardly from the top of each corner shroud 26 and act as stops to prevent the cover portions from pivoting too far open.

Figure 7:
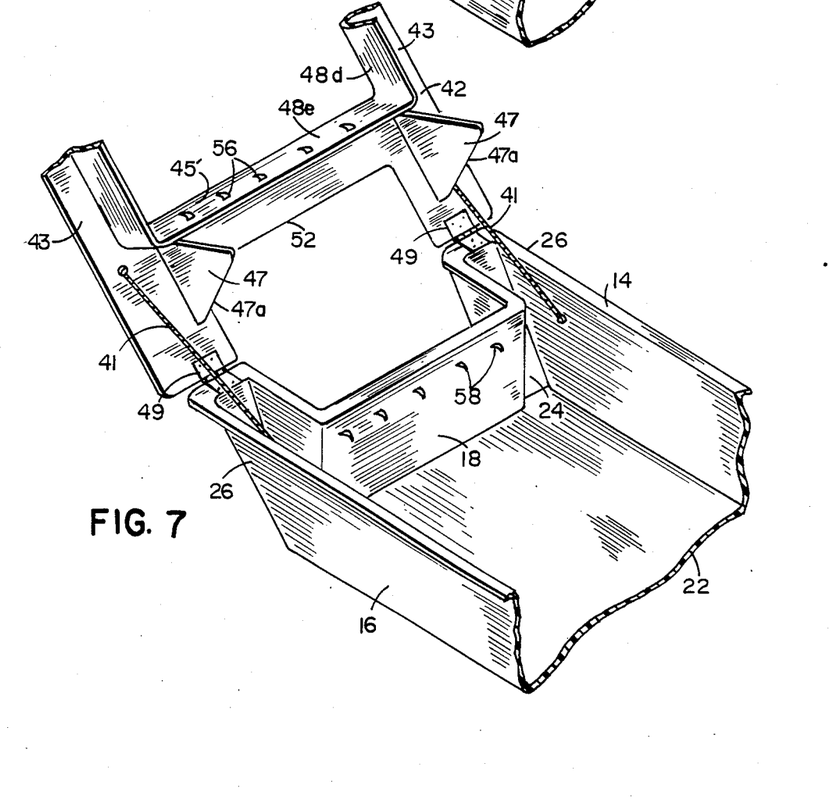
FIG. 7 is a detailed perspective view of the end of the box shown in FIG. 6 without the disposal bag.
Figure 8:
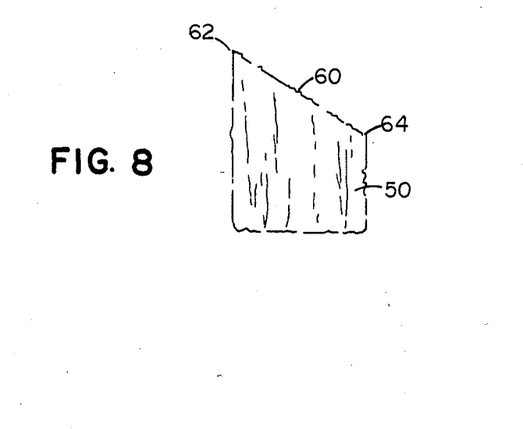
FIG. 8 is a side elevation of a disposal bag which may be used with the cat litter box of the present invention.

As shown in FIGS. 6–8, means for mounting a disposal bag 50 can also be provided. A disposal bag 50 is used to dispose spent cat litter filtered by a "pooper-scooper ™" or by the novel liner system described below. As shown in FIGS. 2 and 7, bight portion 45' of C-shaped cover portion 42 has a recess 52 between the two corner shrouds 26 on either side of sidewall 18. As shown in FIG. 7, recess 52 creates a bag opening when pivotal portion 42 is opened. Barbs 56 are positioned along flange 48e and barbs 58 are positioned along the upper interior edge of sidewall 18 to engage the edges of disposal bag 50. As shown in FIG. 8, disposal bag 50 is a standard plastic bag with a slanted top opening 60 forming an upper edge 62 which has a row of perforations (not shown) made during manufacture to receive barbs 56 and a lower edge 64 which has a row of perforations (not shown) to receive barbs 58. When cover portion 42 is opened, a bag 50 can be temporarily suported from barbs 56 and 58 within bag opening while one of the liners is removed with waste material and spent cat litter. The removed liner is placed in the bag, and the bag is removed and it and its contents disposed of. Barbs 56 and 58 hold bag 50 in an open position which leaves virtually no space around the bag for litter to fall through onto the floor.

The box 10 described above can be injection molded in three major pieces: cover portions 42 and 44 and enclosure 12. The three pieces are then hinged together as described above. Box 10 can also be manufactured in one piece with a living hinge joining portions 42 and 44 with box 10, as discussed above. The assembly can be made of any plastic resistant to degradation on contact with animal waste. Polyethylene is a preferred material.

Figures 9, 10, 11:
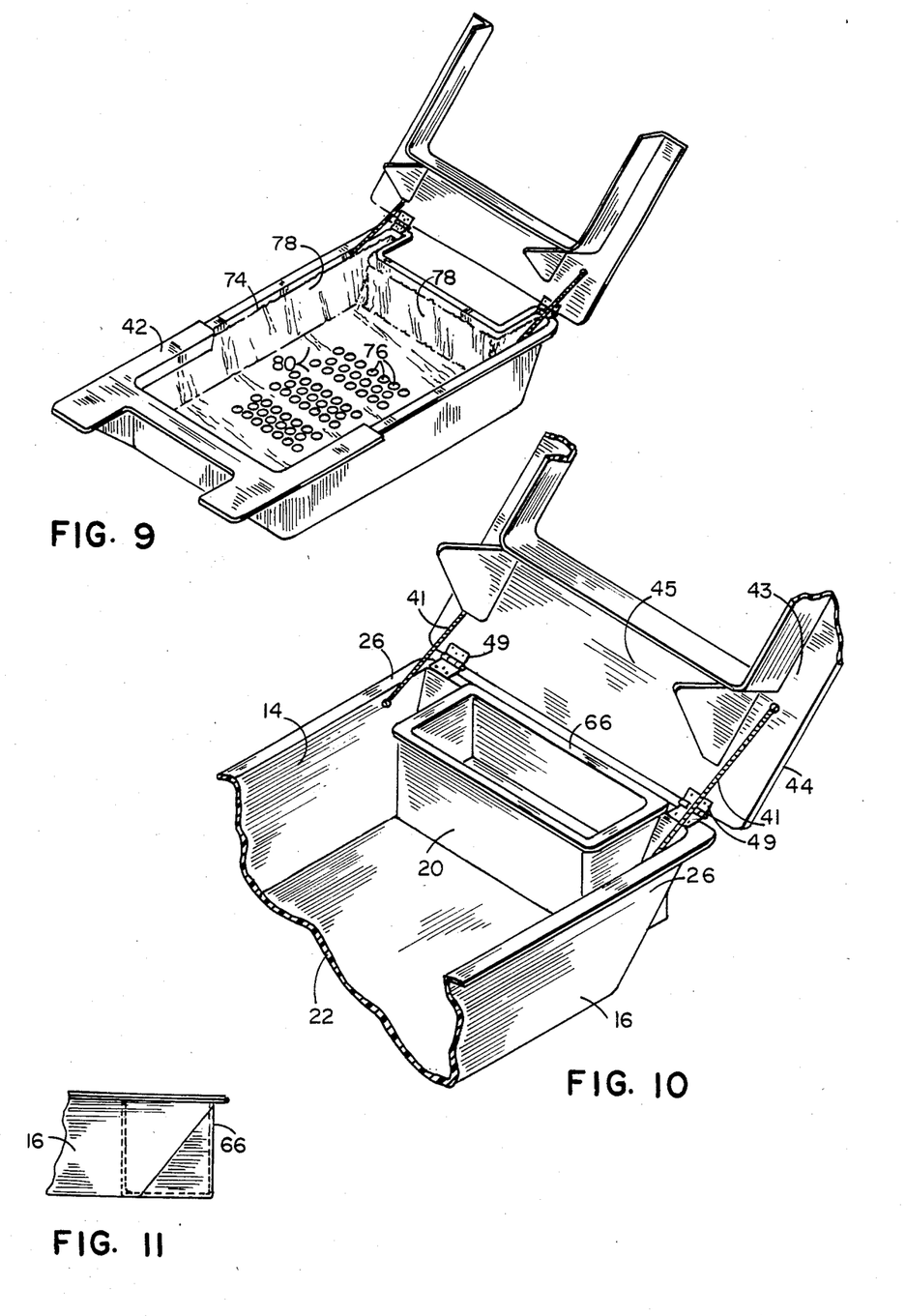
FIG. 9 is a perspective view of the cat litter box shown in FIG. 6 illustrating a cover member portion in the closed position.
FIG. 10 is a detailed perspective view of a modified version of the cat litter box of the present invention.
FIG. 11 is a detailed side elevation of the modified embodiment shown in FIG. 10.

A modified embodiment of the cat litter box 10 of the present invention is illustrated in FIGS. 10 and 11. A storage box 66 can be positioned between the corner shrouds 26 on either side of sidewall 20. Storage box 66 is used to store bags 50. When pivotal portion 44 is opened, a clean disposal bag can be removed from a supply of bags that are placed in storage box 66. The bag is then positioned on barbs 56 and 58. Bight portion 45 of pivotal portion 44 is not recessed between corner shrouds 26 on either side of sidewall 20. Therefore, bight portion 45 covers storage box 66, preventing the animal from getting cat litter in box 66. Storage box 66 can be integrally molded with the rest of enclosure 12 to save on manufacturing expenses.

Figure 12:
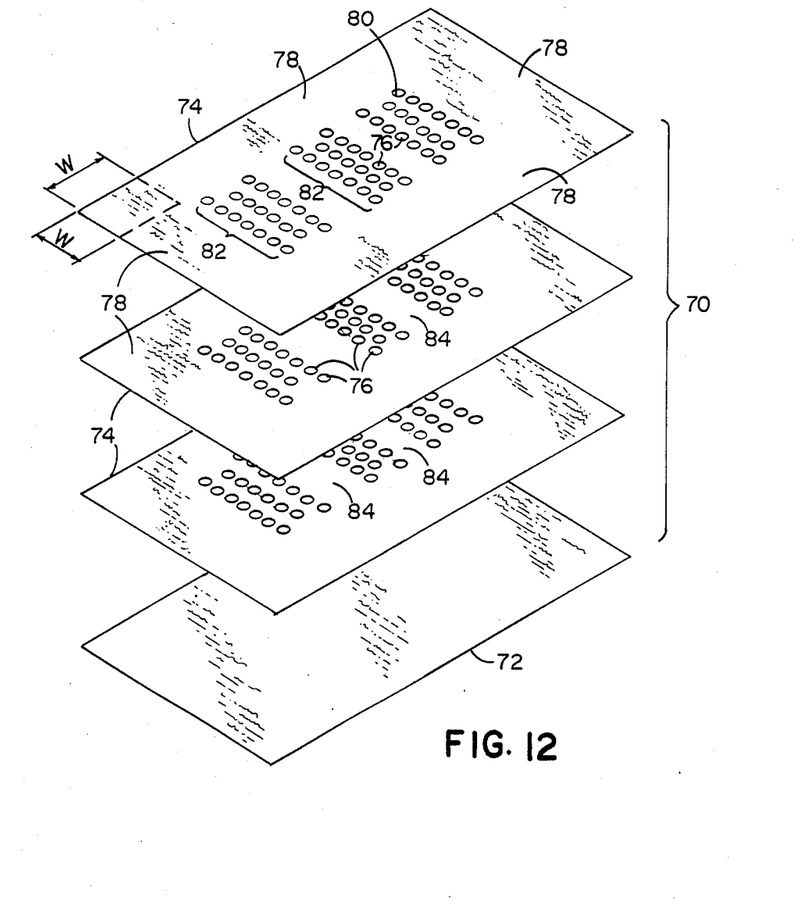
FIG. 12 is an exploded perspective view of a novel cat litter box liner system which can be used in the cat litter box of the present invention.

The novel liner system of the present invention is illustrated in FIG. 12. The liner system 70 comprises a flat base impermeable liner 72 and a plurality of flat foraminous liners 74 placed directly on base liner 72 so as to overlay it. Each foraminous liner 74 includes a plurality of openings 76, for reasons which will be explained below. The foraminous and base liners are preferably made of a polyethylene plastic, which will not disintegrate upon prolonged contact with animal waste. Liners 74 can be die cut from large rolls of plastic. While the outlines of liner 74 are being die cut, openings 76 can be die cut simultaneously.

Liner system 70 can be used to conserve cat litter or any other granular material used in enclosure 12. When cat litter becomes odorous and acrid it is often the case that much of the cat litter is unspent and can be reused. To avoid the time-consuming task of using a "pooper-scooper ™," the liner system 70 of the present invention is used.

The liner system 70 is placed on the bottom of enclosure 12 with base liner 72 placed directly against the bottom wall 22 and with the edge portions of base liner 72 extending upwardly overlying sidewalls 14, 16, 18 and 20. A plurality of foraminous liners 74 can be simultaneously placed with base liner 72 in enclosure 12. Edge portions 78 around the foraminous central portion 80 of each foraminous liner 74 extend upwardly and overlie sidewalls 14, 16, 18 and 20 as shown in FIG. 9. In other words, only the foraminous center portion 80 of each liner 74 overlies bottom wall 22 (FIG. 9), while the edge portions 78 around center portion 80 assume erect positions overlying sidewalls 14, 16, 18 or 20. The edge portions 78 should have a width W (FIG. 12) at least as wide as the height of the sidewalls.

The cat litter is then placed over the uppermost foraminous liner. After the cat litter becomes odorous with use, the granular litter is filtered of fecal matter and cat litter agglomerated with urine simply by removing the upper foraminous liner and allowing the free flowing, unspent cat litter granules to filter through openings 76 and capturing the agglomerated cat litter and solid waste products in the removed foraminous liner. The removed foraminous liner and its contents can then be disposed in disposal bag 50, if desired.

It is easy to remove a foraminous liner without coming in contact with the animal waste. Simply remove the corners of the foraminous liner from shrouds 26 and gather the corners above the center of the box. The unspent litter can be filtered by lifting the gathered liner by its corners out of the box and shaking the removed liner so that the free flowing unspent litter falls through the openings in the removed liner into the box.

The unspent cat litter in enclosure 12 can be supplemented with fresh cat litter if desired. When the remaining cat litter in enclosure 12 becomes odorous, the cat litter can be filtered once again by removing a second foraminous liner 74, capturing the solid wastes and agglomerated cat litter in the removed liner and disposing of the removed liner and its contents in disposal bag 50.

As shown in FIGS. 9 and 12, the foraminous central portion 80 of each foraminous liner 74 includes spaced sets 82 of holes 76 connected by imperforate areas 84 which extend between opposite edge portions 78. Imperforate areas 84 add strength to the central portion 80 and aid in retaining large clumps of waste material.

Figure 15:
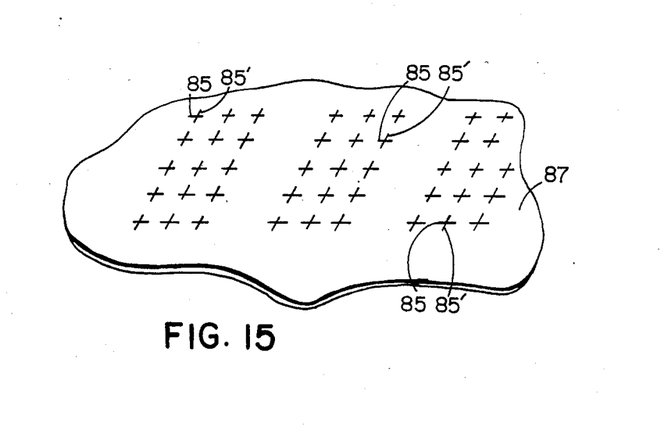
FIG. 15 is a detailed perspective view of an alternative foraminous liner.

As shown in FIGS. 9 and 12, imperforate areas 84 extend transversely across central portion 80. However, they could extend lengthwise of the mat as well. Furthermore, holes 76 are circular in shape. However, as shown in FIG. 15, each hole could also be made of two intersecting, perpendicular slits 85, 85' in the form of crosses which allow matter to fall through an opening which forms when the slits spread apart under the weight of the litter when the modified foraminous liner 87 is removed. Each hole could also be made of a single slit which spreads open under the weight of the cat litter.

The process of removing foraminous liners 74 and filtering the unspent cat litter can be done as many times as desired. Usually, it can only be done three or four times before the filtered cat litter is completely useless. The liner system 70 illustrated in FIG. 12 is designed for three filterings. At the end of three filterings, the remaining cat litter is used for a time and then disposed by removing the impermeable base liner 72, placing it in disposal bag 50 and throwing away bag 50 and its contents. Enclosure 12 can be cleaned, if necessary, and a new liner system 70 installed.

Preferably, liners 72 and 74 are made from thin sheets of plastic such as polyethylene. The liners can be die cut to size with the openings in the foraminous liners being die cut at the same time the foraminous liners are being cut from larger sheets of plastic. Each opening through liner 74 is about one-half inch in diameter, but somewhat smaller openings could be used.

The liners and bags are best sold together. Bags 50 can be sold in a package with liners 72 and 74, with as many bags as liners 72 and 74. The bags are placed in storage box 66 until needed.

Each filtering can be done very quickly without prolonged exposure to odor causing wastes. At the same time, the cat litter is conserved by providing a liner system which permits unspent cat litter to be reused. Finally, the novel animal waste receiving container of the present invention permits the use of flat liners which cover both the bottom and sides of the container. Costly contoured liners are unnecessary.

Figure 13:
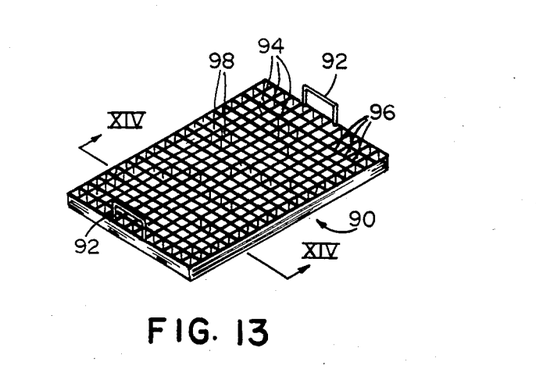
FIG. 13 is a perspective view of a filtering grate which can be used with the cat litter box of the present invention.

Instead of using disposable foraminous liners, it is possible to use a rectangular metal or plastic grate 90 (FIG. 13) having an area as large as the bottom 22 of enclosure 12 and having handles 92 at each end. Grate 90 is made of a plurality of parallel longitudinal members 94 and a plurality of parallel lateral members 96 perpendicular to longitudinal members 94. The grate is placed in the bottom of enclosure 12 above a flat, imperforate disposable liner. Cat litter is placed on grate 90. When the cat litter becomes odorous, grate 90 is lifted out of enclosure 12 by handles 92, and the unspent litter granules flow through openings 98 in grate 90 while waste products are caught on the grate. Grate 90 is then cleaned and can be put back into the enclosure by pushing it downwardly through the litter until the grate is directly overlaying the liner on the bottom of the enclosure.

Figure 14:
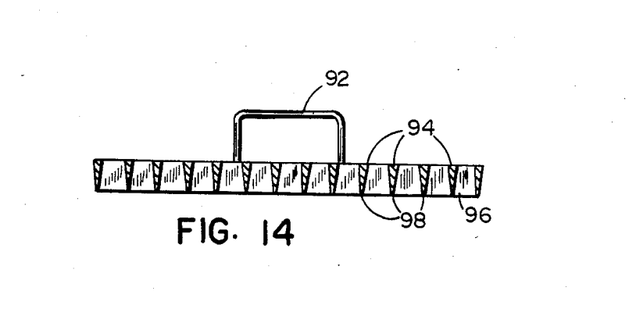
FIG. 14 is a cross section taken along the plane of line XIV—XIV of FIG. 13.

To facilitate the insertion of grate 90 through the unspent cat litter, both longitudinal members 94 and lateral members 96 have narrow, downwardly tapering cross sections (FIG. 14) which terminate in sharp edges 98. Edges 98 slice through the unspent cat litter when grate 90 is replaced after the litter is filtered. As with the disposable foraminous liner system, grate 90 permits the repeated filtering of unspent cat litter so that litter waste is reduced.

While several forms of the invention have been shown and described, other forms will be apparent to those skilled in the art. Therefore, it will be understood that the embodiments shown in the drawings and described above are merely for illustrative purposes and are not intended to limit the invention which is defined by the claims which follow.

The embodiments of the invention in which an exclusive property or privilege is claimed are defined as follows:

1. A container for receiving a liner and a granular material to be placed in the liner for absorbing and covering animal waste, comprising:

a rectangular enclosure having erect sidewalls and a bottom wall wherein gather receiving apertures are provided at each corner between adjacent sidewalls of said enclosure and adapted to accommodate the gathering of corner portions of a sufficiently large, flat, rectangular liner placed in said enclosure overlying said bottom wall, with edge portions of the liner assuming an erect orientation adjacent said sidewalls; and a spreading member mountable on said rectangular enclosure, said spreading member having a plurality of projections thereon, said projections spaced and configured to mate with said gather receiving apertures and to be at least partially received therethrough, whereby said spreading member projections force said liner corner portions through said gather receiving apertures and thereby maintain said liner edge portions in said erect orientation.

2. The container as recited in claim 1 further comprising a corner shroud extending outwardly from each corner of said enclosure, the corner shrouds enclosing said gather receiving apertures from the outside of said enclosure.

3. The container as recited in claim 2 wherein each corner shroud has a bottom which slopes upwardly from said bottom wall of said enclosure, and each said spreading member projection has a sloping bottom complementary to said corner shroud bottom.

4. The container as recited in claim 2 wherein the corner shrouds are integrally formed with said enclosure.

5. The container as recited in claim 1 wherein said spreading member comprises a cover positioned on the tops of said enclosure sidewalls, said cover having a large central opening and downwardly oriented flanges around said central opening overlying the upper interior surfaces of said enclosure sidewalls so as to hold the liner edge portions erect overlying said sidewalls.

6. The container as recited in claim 5 wherein said cover includes two pivoting portions which pivot away from each other to expose said upper interior surfaces of said enclosure sidewalls.

7. The container recited in claim 1, further comprising:
an impermeable flexible liner member; and
an least one flexible foraminous liner member overlying said impermeable liner member, said at least one foraminous liner member and said impermeable liner member to be placed in overlying relationship with the inside surfaces of the container with the granular media placed on said liner members,
whereby animal waste can be filtered from the granular media placed on said at least one foraminous liner member by removing said at least one foraminous liner member, sifting said granular media through the openings in said at least one foraminous liner member and capturing the animal waste in said at least one foraminous liner member.

8. The liner system as recited in claim 7 wherein said at least one foraminous liner member and said impermeable liner member comprise flat sheets.

9. The liner system as recited in claim 7 wherein said at least one foraminous liner member and said impermeable liner member are made of plastic.

10. The liner system as recited in claim 7 wherein said at least one foraminous liner member has a central portion with a plurality of openings therethrough and impermeable side portions extending around said central portion.

11. The liner system as recited in claim 10 wherein said at least one foraminous liner member has at least one imperforate area extending across said central portion between opposite side portions.

12. The liner system as recited in claim 7 which comprises a plurality of said foraminous liner members.

13. The container recited in claim 1, wherein said spreading member comprises a cover having said projections depending therefrom, said cover pivotally coupled to said enclosure.

14. The container recited in claim 13, wherein said cover comprises at least two cover sections, said cover sections each pivotally coupled to said enclosure such that said projections are pivotally received through said gather receiving apertures.

15. A container for receiving a liner and a granular material to be placed in the liner for absorbing and covering animal waste, comprising:
 a rectangular enclosure having erect sidewalls and a bottom wall wherein means are provided at each corner between adjacent sidewalls of said enclosure to accommodate the gathering of corner portions of a sufficiently large, flat, rectangular liner placed in said enclosure overlying said bottom wall, with edge portions of the liner assuming an erect orientation overlying said sidewalls;
 said accommodation means defining a gap at each enclosure corner between adjacent sidewalls of said enclosure to permit the material which gathers at the corners of a flat liner placed in said enclosure to cover said sidewalls and bottom to project through said gaps outwardly from said enclosure corners; and
 a corner shroud extending outwardly from each corner of said enclosure, the corner shrouds enclosing each said gap from the outside of said enclosure, each corner shroud having a bottom which slopes upwardly from said bottom wall of said enclosure, and each corner shroud having a pair of spaced sidewalls extending upwardly from said sloping bottom.

16. The container as recited in claim 15 which further includes a cover member positioned on the tops of said enclosure sidewalls, said cover member having a large central opening and downwardly oriented flanges around said central opening overlying the upper interior surfaces of said enclosure sidewalls so as to hold the liner edge portions erect overlying said sidewalls.

17. The container as recited in claim 16 wherein said cover member includes two pivoting portions which pivot away from each other to expose said upper interior surfaces of said enclosure sidewalls.

18. The container as recited in claim 17 which further includes means at one side of said container to accommodate a disposal bag and wherein one of said pivoting portions operates to hold said bag when pivoted to its open position.

19. The container as recited in claim 16 wherein said cover member includes, for each corner shroud, a projecting member which projects downwardly into said corner shroud when said cover member is in position so as to hold the corner portions of said liner against said sloping bottom.

20. A container for receiving a liner and a granular material to be placed in the liner for absorbing and covering animal waste, comprising:
 a rectangular enclosure having erect sidewalls and a bottom wall wherein means are provided at each corner between adjacent sidewalls of said enclosure to accommodate the gathering of corner portions of a sufficiently large, flat, rectangular liner placed in said enclosure overlying said bottom wall, with edge portions of the liner assuming an erect orientation overlying said sidewalls;
 said accommodation means including a gap at each enclosure corner between adjacent sidewalls of said enclosure to permit the material which gathers at the corners of a flat liner placed in said enclosure to cover said sidewalls and bottom to project through said gaps outwardly from said enclosure corners, and a corner shroud extending outwardly from each corner of said enclosure, the corner shrouds enclosing each gap from the outside of said enclosure; and
 a cover member positioned on the tops of said enclosure sidewalls, said cover member having a large central opening and downwardly oriented flanges around said central opening overlying the upper interior surfaces of said enclosure sidewalls so as to hold the liner edge portions erect overlying said sidewalls, said cover member including two pivoting portions which pivot away from each other to expose said upper interior surface of said enclosure sidewalls, and said cover member including, for each corner shroud, a projecting member which projects downwardly into said corner shroud when said cover member is in position so as to hold the corner portions of said liner against said sloping bottom.

21. An animal litter tray, comprising a closed bottom with generally upstanding sidewalls with liner receiving openings along said sidewalls adapted to receive excess portions of a flat liner placed in said tray on said bottom and overlying said sidewalls, said liner receiving openings being positioned and configured to cause the edge portions of the liner not in contact with the bottom to deform in overlapping relationship to said walls; and
 detent means comprising projection members urgeable into and out of said liner receiving openings for positively retaining said excess portions through said liner receiving openings.

22. The animal litter tray as recited in claim 21 which further comprises peripheral engagement means located along the top edges of said sidewalls to conceal the peripheral edges of said liner and maintain the liner edge portions in overlapping relationship with said sidewalls.

* * * * *